United States Patent
Boekle et al.

(10) Patent No.: US 8,863,719 B2
(45) Date of Patent: Oct. 21, 2014

(54) PIN BOSSES OF A PISTON FOR AN INTERNAL COMBUSTION ENGINE

(75) Inventors: Harald Boekle, Moeglingen (DE); Gottfried Schnaitmann, Backnang (DE); Rainer Fischer, Stuttgart (DE); Ralf Braig, Schorndorf (DE); Helmut Mueller, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 13/513,303

(22) PCT Filed: Dec. 2, 2010

(86) PCT No.: PCT/DE2010/001398
§ 371 (c)(1),
(2), (4) Date: Sep. 11, 2012

(87) PCT Pub. No.: WO2011/066821
PCT Pub. Date: Jun. 9, 2011

(65) Prior Publication Data
US 2013/0000591 A1    Jan. 3, 2013

(30) Foreign Application Priority Data
Dec. 3, 2009    (DE) .................. 10 2009 056 920

(51) Int. Cl.
*F02F 3/00* (2006.01)
*B23P 15/10* (2006.01)
*B21K 1/44* (2006.01)
*F16J 1/14* (2006.01)
*F16J 1/16* (2006.01)

(52) U.S. Cl.
CPC .. *F16J 1/16* (2013.01); *B23P 15/10* (2013.01); *F02F 2200/06* (2013.01)

USPC .................. 123/193.6; 29/888.05; 29/888.04; 92/187

(58) Field of Classification Search
CPC ................... F16J 1/16; F16J 1/22; F16J 1/14; F02B 55/02; F02B 55/08; F02F 3/22; F02F 2200/06; B23B 31/302; B23B 45/046; B23B 45/048; B23B 2215/245; B23P 15/10
USPC ....................................................... 123/193.6
See application file for complete search history.

(56) References Cited

U.S. PATENT DOCUMENTS 3,357,318 A * 12/1967 Packard et al. .................. 92/187
4,124,010 A * 11/1978 Fiedler ........................ 123/193.6

(Continued)

FOREIGN PATENT DOCUMENTS

DE    1 650 206    8/1970
DE    2 152 462    4/1973

(Continued)

OTHER PUBLICATIONS

International Search Report of PCT/DE2010/001398, Mar. 25, 2011.

(Continued)

*Primary Examiner* — Lindsay Low
*Assistant Examiner* — Syed O Hasan
(74) *Attorney, Agent, or Firm* — Collard & Roe, P.C.

(57) ABSTRACT

Pin bosses of a piston for an internal combustion engine each have a pin bore for supporting a piston pin. In order to reduce the tangential stresses in the zenith area of the pin bores, and thus to extend the service life of the piston, the inner areas of the pin bores as viewed in the direction of the bore axis have areas on both sides of the zenith that have a greater distance from the bore axis than the zenith of the pin bore, and the outer areas of the pin bores, as viewed in the direction of the bore axis, are transversely oval relative to the piston axis.

1 Claim, 6 Drawing Sheets

(56) References Cited

U.S. PATENT DOCUMENTS

Figure 1:
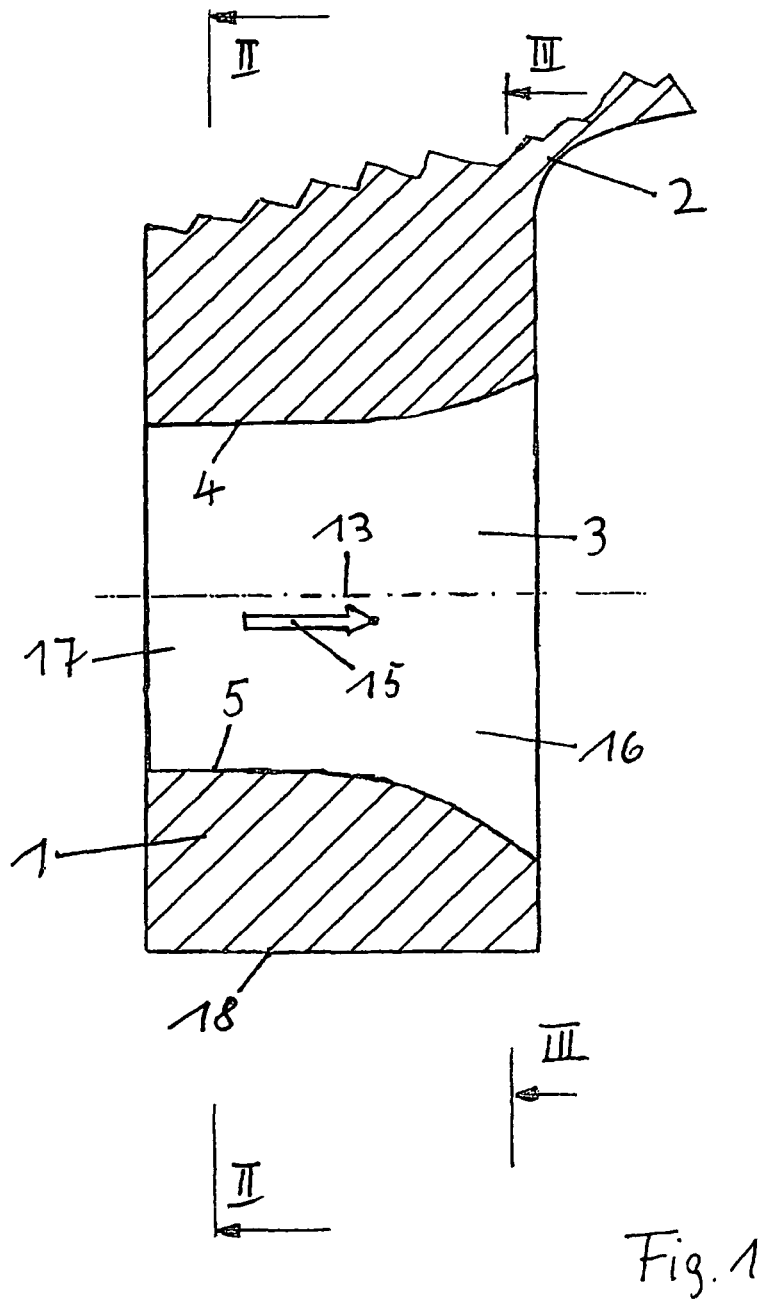

| | | | |
|---|---|---|---|
| 5,063,831 A | 11/1991 | Byard | |
| 5,072,654 A | 12/1991 | MacGregor | |
| 5,653,156 A * | 8/1997 | Issler et al. | 92/187 |
| 6,279,456 B1 * | 8/2001 | Ueshima et al. | 92/187 |
| 7,305,960 B2 | 12/2007 | Zvonkovic | |
| 7,647,863 B2 * | 1/2010 | Issler et al. | 92/187 |
| 8,011,287 B2 * | 9/2011 | Fezer | 92/187 |
| 2008/0307957 A1 | 12/2008 | Kamp | |

FOREIGN PATENT DOCUMENTS

| | | |
|---|---|---|
| DE | 30 36 062 | 4/1982 |
| DE | 31 20 842 | 12/1982 |
| DE | 36 09 019 | 9/1987 |
| DE | 44 41 450 | 5/1996 |
| DE | 102 31 233 | 2/2004 |
| DE | 10 2005 041 907 | 3/2007 |
| DE | 10 2006 015 586 | 10/2007 |
| GB | 851322 | 10/1960 |
| GB | 1 206 878 | 9/1970 |
| JP | 10-103513 | 4/1998 |
| JP | 11-303993 | 11/1999 |
| JP | 2004-028025 | 1/2004 |

OTHER PUBLICATIONS

German Search Report dated Dec. 3, 2009 in German Application No. 10 2009 056 920.0 with English translation of the relevant parts.

* cited by examiner

PIN BOSSES OF A PISTON FOR AN INTERNAL COMBUSTION ENGINE

CROSS REFERENCE TO RELATED APPLICATIONS

This application is the National Stage of PCT/DE2010/001398 filed on Dec. 2, 2010, which claims priority under 35 U.S.C. §119 of German Application No. 10 2009 056 920.0 filed on Dec. 3, 2009, the disclosure of which is incorporated by reference. The international application under PCT article 21(2) was not published in English.

The invention relates to pin bosses of a piston for an internal combustion engine, having a pin bore, in each instance, for mounting of a piston pin.

Pin bosses of a piston for an internal combustion engine are known from the Offenlegungsschrift [published unexamined patent application] DE 10 2006 015 586 A1, which have pin bores that are configured to be longitudinally oval, passing through from radially inside to radially outside, in the direction of the piston axis. It is disadvantageous, in this connection, that the piston pin, which is mounted in the pin bore, deforms in transversely oval manner under the stress of gas pressure, so that in this connection, the zenith region of the pin bore, in particular, is exposed to elevated tangential stresses, in other words tensile stresses that lie tangential to the inside surface of the bore, which stresses bring about a reduction in the useful lifetime of the piston.

From the German Offenlegungsschrift 1 650 206, pin bosses of a piston for an internal combustion engine are known, which have pin bores that are configured to be transversely oval with reference to the piston axis. This has the disadvantage that the nadir region of the pin bores is exposed to elevated tangential stresses under the stress of mass force, at elevated speeds of engine rotation, and these stresses also bring about a reduction in the useful lifetime of the piston.

Accordingly, it is the task of the present invention to avoid the stated disadvantages of the state of the art and to improve the pin bores of the pin bosses of a piston for an internal combustion engine to the effect that the piston withstands the stresses that occur during engine operation, in that the tangential stresses in the pin bore are reduced to the greatest possible extent.

This task is accomplished in that the inner regions of the pin bores, seen in the direction of the bore axis, have regions on both sides of the zenith, which have a greater distance from the bore axis than the zenith of the pin bore, that the zenith of the pin bore has a lesser distance from the bore axis in the inner region of the pin bores than the nadir of the pin bores, that the outer regions of the pin bores, seen in the direction of the bore axis, are configured to be transversely oval with regard to the piston axis, and that the inner regions of the pin bores make a constant transition into the outer regions of the pin bores.

Advantageous embodiments of the invention are the object of the dependent claims.

Figure 2:
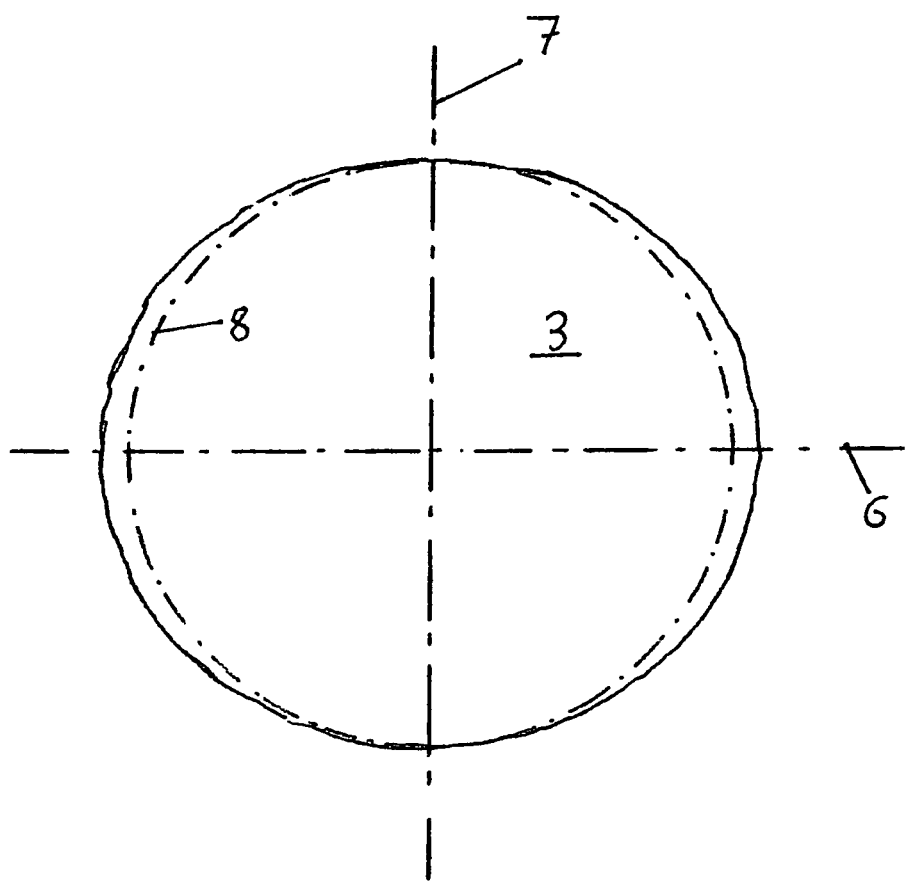
Figure 3:
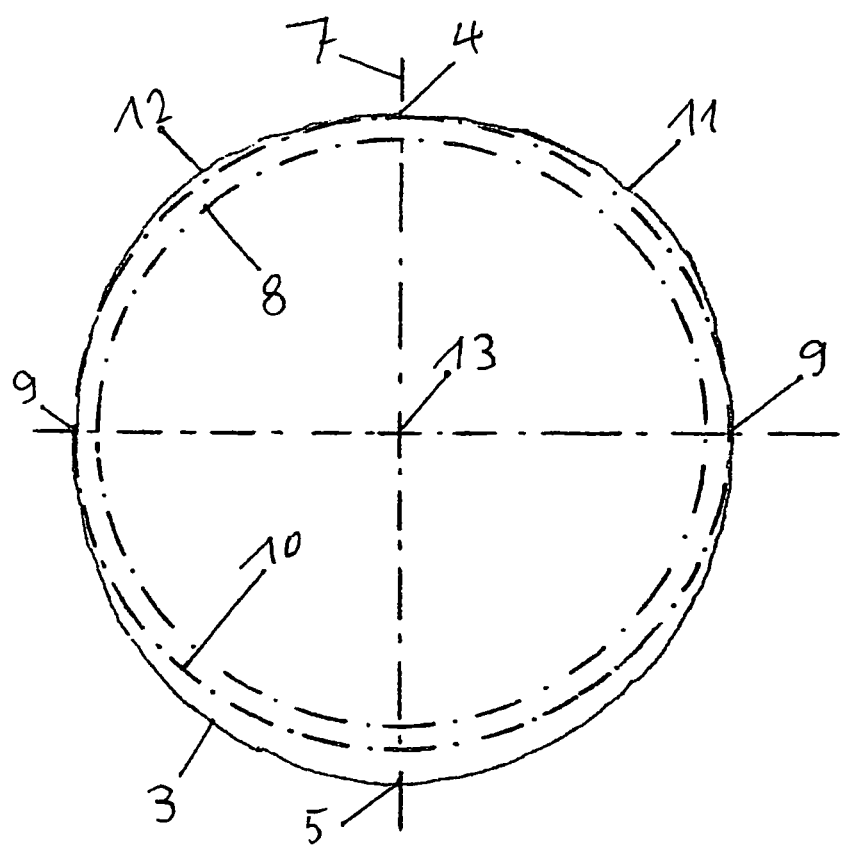
Figure 4:
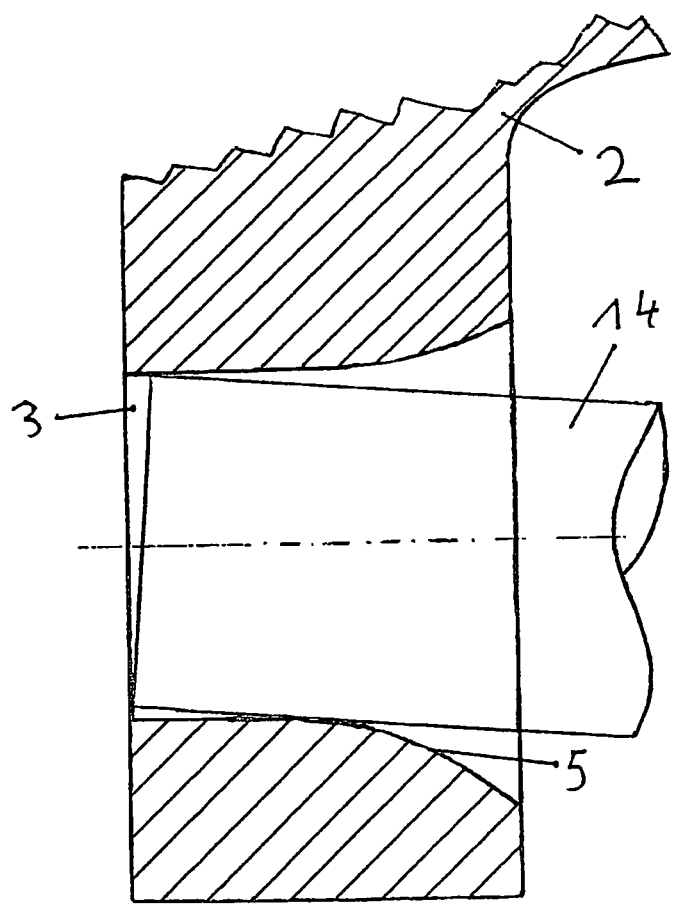
Figure 5:
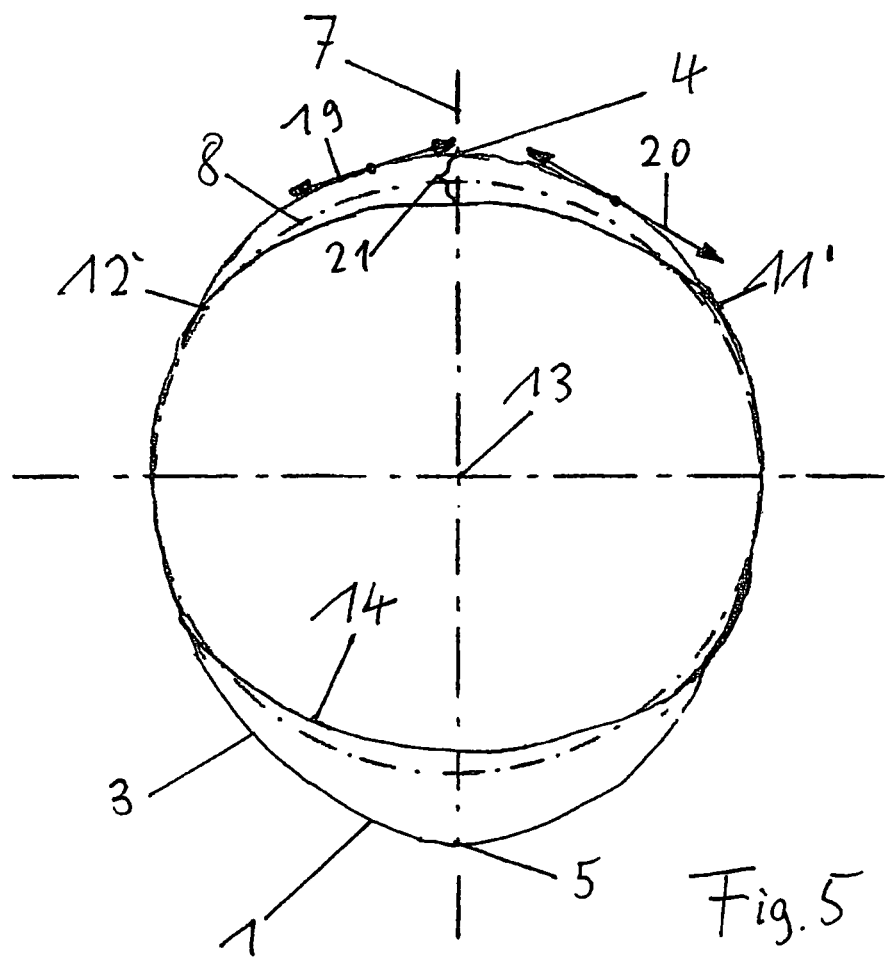
Figure 6:
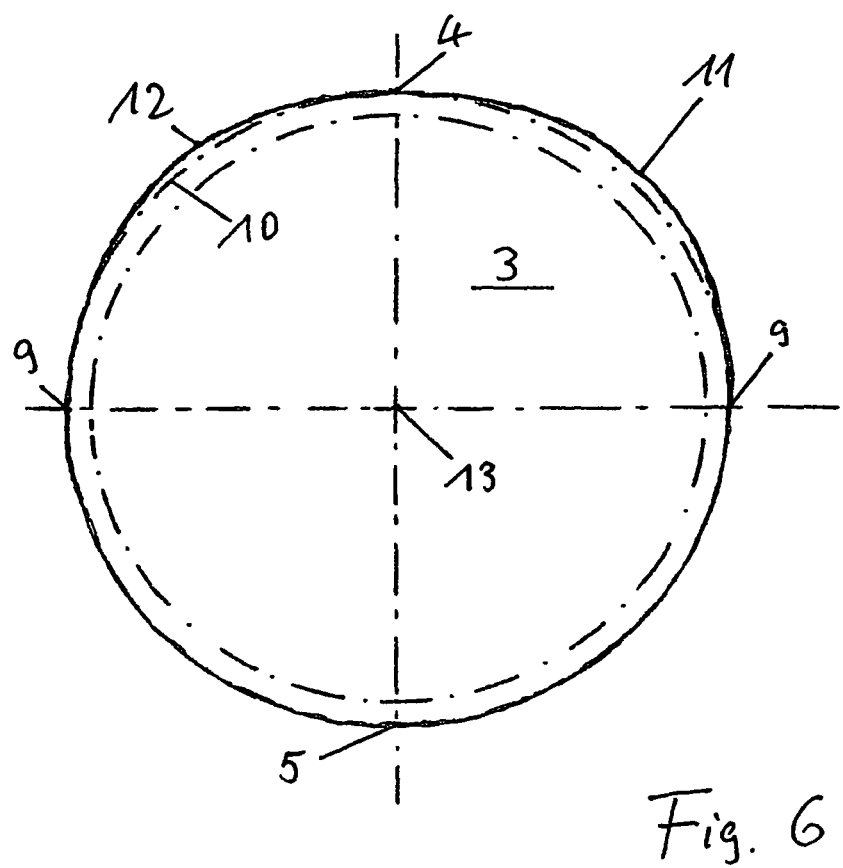

Some exemplary embodiments of the invention will be explained in the following, using the drawings. These show:

FIG. 1 a pin boss for an internal combustion engine having the pin bore according to the invention, in section, FIG. 2 a cross-section through the pin bore along the line II-II in FIG. 1, FIG. 3 an embodiment of the cross-section through the pin bore along the line III-III in FIG. 1, FIG. 4 the pin bore according to the invention with a piston pin disposed in it, deformed due to the mechanical stresses, and FIGS. 5 and 6 further embodiments of the pin bore along the line in FIG. 1.

FIG. 1 shows a pin boss 1 of a piston 2 for an internal combustion engine, in section along the bore axis 13 of the pin bore 3. The plane section in FIG. 1 is laid through the pin boss 1 in such a manner that the zenith 4 of the pin bore 3, in other words the upper region of the pin bore 3, facing away from the lower end 18 of the piston 2, and the nadir 5 of the pin bore 3, in other words the lower region of the pin bore 3, can be seen. In this connection, the zenith 4 describes an upwardly bent line, from the outside to the inside, in other words in the direction of the arrow 15, while the nadir 5 describes a downwardly bent line, from the outside to the inside, which means that the diameter of the pin bore 3 increases from the outside to the inside between nadir 5 and zenith 4.

The section through the outer region 17 of the pin bore 3 shown in FIG. 2, along the line II-II in FIG. 1, shows that the pin bore 3 is configured to be transversely oval on the outside, whereby the major axis 6 of ovality lies perpendicular to the piston axis 7. For a better representation of the ovality of the pin bore 3, a first, circular auxiliary line 8 is drawn as a dot-dash line in FIG. 2.

Alternatively to this, the outer part of the pin bore 3 can also be configured to be longitudinally oval in the direction of the piston axis 7, or also circular, in the region of the nadir 5.

FIG. 3 shows a section through an embodiment of the inner region 16 of the pin bore 3 along the line III-III in FIG. 1. As can be seen, however, using the circular, second auxiliary line 10, also on the basis of FIG. 1, the distance of the nadir 5 of the pin bore 3 from the bore axis 13 is greater in the inner region 16 than the distance of the zenith 4 of the pin bore 3 from the bore axis 13, so that asymmetry of the pin bore 3 results on the inside.

Furthermore, in FIG. 3, it can be seen well, on the basis of the first auxiliary line 8, that the inner region 16 of the pin bore 3, as shown in FIG. 3, has a greater diameter than the outer region 17 of the pin bore 3 shown in FIG. 2.

Using the second auxiliary line 10, it can furthermore be seen well that the nadir 5 of the embodiment of the pin bore 3 shown in FIG. 3 is configured to be longitudinally oval, whereby the major axis of ovality lies parallel to the piston axis 7, while the pin bore 3 has a transversely oval shape in the region of the zenith 4 in the present exemplary embodiment, as the regions 11 and 12 on both sides of the zenith region 4 of the pin bore 3 show, which, as can be seen well using the second auxiliary line 10, have a greater distance from the bore axis 13, in each instance, than the distance from the bore axis 13 that the pin bore 3 has in the region of the zenith 4 and in the region of the equator 9 that lies between zenith 4 and nadir 5.

Alternatively to this, the inner region 16 of the pin bore 3 can be configured to be longitudinally oval, in the direction of the piston axis 7, in the region of the zenith 4 and also in the region of the nadir 5, as shown in FIG. 5. Here again, the nadir 5 of the pin bore 3 has a greater distance from the bore axis 13 than the zenith 4 of the pin bore 3.

Furthermore, in the exemplary embodiment according to FIG. 5, the zenith 4 of the pin bore 3 can have a circular cross-section in the inner region 16 of the pin bore 3 (not shown in the figures).

In another embodiment of the inner region 16 of the pin bore 3 along the line in FIG. 1, shown in FIG. 6, the nadir 5 has a circular shape, and the zenith 4 is configured to be transversely oval, as the regions 11 and 12 on both sides of the zenith region 4 of the pin bore 3 show, which, as can be seen using the second auxiliary line 10, have a greater distance from the bore axis 13, in each instance, than the distance of the pin bore 3 from the bore axis 13 in the region of the zenith 4 and in the region of the equator 9.

As shown in FIG. 4, the piston pin 14 deforms at greater speeds of rotation of the engine, due to the inertia of the piston 2, at the upper dead center, to such an extent that it forms an arc directed downward, whereby the left end of the piston pin 14 deformed in this way is shown in FIG. 4.

In the case of a conventional configuration of the pin bore, in which the widened regions in the zenith region and in the nadir region lie symmetrical to one another, the radially inner nadir region 5 develops the greatest mechanical stress under the stress of weight force. The greater widening of the inner nadir region 5 shown in FIGS. 1 and 4 leads to the result that stresses are displaced from the inner region 16 of the nadir 5 in the direction of the nadir region 5 that lies further outward. This has the advantage of a clear reduction in mechanical stresses in the inner nadir region 5 of the pin bore 3, thereby resulting in an extension of the useful lifetime and a reduction in the pin boss cross-section, above all with the advantage of a lesser piston mass.

Transverse ovalization of the piston pin 14, which has a circular cross-section in the unstressed state, occurs under the stress of gas pressure (as shown in FIG. 5), whereby the major axis of transverse ovalization of the piston pin 14 lies perpendicular to the piston axis 7. As a result, the regions 11' and 12' on both sides of the zenith region 4 of a circular pin bore 3 (indicated with the auxiliary line 8 in FIG. 5) are subject to relatively great stress.

As a result, a gap 21 occurs between the transversely oval piston pin 14 and the zenith 4 of the pin bore 3. A force that reduces this gap 21 acts on the pin boss 1 during the work cycle, as the result of the gas pressure that acts on the piston 2, which force causes tensile stresses, in other words tangential stresses in the direction of the arrows 19 and 20 in the pin boss 1, in the region of the zenith 4 of the pin bore 3. A reduction in the useful lifetime of the pin boss 1 results from these tangential stresses.

If the regions 11 and 12 on both sides of the zenith 4 of the inner region 16 of the pin bore 3, as shown in FIG. 3, are now provided with greater play, the regions 11 and 12 are subjected to less stress by the piston pin 14, which is also shaped to be transversely oval (not shown in FIG. 3), and, in this connection, the gap in the zenith 4 is reduced, so that a significant lengthening of the useful lifetime of the pin boss 1 and of the piston equipped with it is obtained as a result.

For the same reasons, the tangential stresses caused in the zenith 4 by the piston pin 14 that is deformed in transversely oval manner under load are reduced in the outer region 17 of the pin bore 3, which is configured to be transversely oval and is shown in FIG. 2, and this results in a further contribution to the lengthening of the useful lifetime of the pin boss 1 and of the piston equipped with it.

Above all, pistons having an extremely small compression height, in other words having an extremely small distance between piston crown and bore axis 13, by which racing engines, for example, are characterized, experience bending about the bore axis 13 under the pressure of the combustion gases during the work cycle. This can be counteracted in that, as shown in FIG. 5, the zenith 4 of the radially inner region of the pin bore 3 is configured to be longitudinally oval in the direction of the piston axis 7. With the bending of the piston as indicated, the regions 11' and 12' of the pin bore 3 of the pin boss 1 then come to lie against the piston pin 14, thereby reducing this bending of the piston about the bore axis 13. In racing engines, this advantage has greater significance as compared with the advantage of a lengthened useful lifetime.

REFERENCE SYMBOL LIST

1 pin boss
2 piston
3 pin bore
4 zenith of the pin bore 3
5 nadir of the pin bore 3
6 major axis of ovality
7 piston axis
8 first, circular auxiliary line
9 equator of the pin bore 3
10 second, circular auxiliary line
11, 11', 12, 12' regions of the pin bore 3
13 bore axis
14 piston pin
15 arrow
16 inner region of the pin bore 3
17 outer region of the pin bore 3
18 lower end of the piston
19, 20 arrow
21 gap

The invention claimed is:

1. Pin bosses (1) of a piston (2) for an internal combustion engine, each pin boss having a pin bore (3) with bore axis (13), for mounting a piston pin (14), the pin bore having an inner region extending toward an inside surface of the pin boss and an outer region extending toward an outside surface of the pin boss,
   wherein
      the inner regions (16) of the pin bores (3), seen in the direction of the bore axis (13), have regions (11, 12) on both sides of the zenith (4), which have a greater distance from the bore axis (13) than the zenith (4) and an equator that lies between the zenith and a nadir of the pin bore (3),
      the zenith (4) of the pin bore (3) has a lesser distance from the bore axis (13) in the inner region (16) of the pin bores (3) than the nadir (5) of the pin bores (3) in said inner region,
      the outer regions (17) of the pin bores (3), seen in the direction of the bore axis (13), are configured to be longer in a horizontal direction than in a vertical direction, with regard to the vertical piston axis (7),
      the inner regions (16) of the pin bores (3) make a constant transition into the outer regions (17) of the pin bores (3) and
      the nadir (5) of the inner regions (16) of the pin bores (3), seen in the direction of the bore axis (13), is configured to be longitudinally oval in the direction of the piston axis (7).

* * * * *